United States Patent [19]
Craig

[11] Patent Number: 5,721,417
[45] Date of Patent: Feb. 24, 1998

[54] HIGH DEPOSITION WELD GUN NOZZLE

[75] Inventor: Ed Craig, Troy, Mich.

[73] Assignee: ABB Flexible Automation Inc., New Berlin, Wis.

[21] Appl. No.: 593,151

[22] Filed: Feb. 1, 1996

[51] Int. Cl.$^6$ ........................................... B23K 9/173
[52] U.S. Cl. ................... 219/137.43; 219/124.34; 219/136
[58] Field of Search ............... 219/124.34, 137.42, 219/137.43, 137.2, 137.7, 136, 74, 75

[56] References Cited

U.S. PATENT DOCUMENTS

| | | | |
|---|---|---|---|
| 2,769,894 | 11/1956 | Rives. | |
| 2,881,305 | 4/1959 | Wojciak et al.. | |
| 2,965,746 | 12/1960 | Cresswell | 219/137.2 |
| 3,025,387 | 3/1962 | Kinney | 219/75 |
| 3,047,714 | 7/1962 | Wepfer | 219/137.42 |
| 3,089,022 | 5/1963 | Kinney | 219/137.7 |
| 3,210,523 | 10/1965 | Cotter et al.. | |
| 3,265,856 | 8/1966 | Cecil. | |
| 3,469,070 | 9/1969 | Bernard et al.. | |
| 3,597,576 | 8/1971 | Bernard et al. | 219/136 |
| 4,563,569 | 1/1986 | Shiramizu et al. | 219/137.43 |
| 5,371,337 | 12/1994 | Campbell et al.. | |
| 5,408,065 | 4/1995 | Campbell et al.. | |
| 5,440,100 | 8/1995 | Stuart et al.. | |

FOREIGN PATENT DOCUMENTS

| | | | |
|---|---|---|---|
| 218577 | 2/1985 | Germany | 219/124.34 |
| 58-13475 | 1/1983 | Japan | 219/124.34 |
| 58-125376 | 7/1983 | Japan | 219/137.42 |
| 58-224073 | 12/1983 | Japan | 219/124.34 |
| 60-21184 | 2/1985 | Japan | 219/137.43 |
| 62-0050086 | 3/1987 | Japan. | |
| 5-8045 A | 1/1993 | Japan. | |
| 6-238453 A | 8/1994 | Japan. | |

*Primary Examiner*—Clifford C. Shaw
*Attorney, Agent, or Firm*—Harness, Dickey & Pierce, P.L.C.

[57] ABSTRACT

A guide member for guiding a wire from a nozzle of a gas metal-arc welding device. The guide member includes a ceramic body portion having a generally centrally located opening for receiving and guiding an electrode wire therethrough. A plurality of gas diffusion openings are provided in the ceramic body portion radially outward from the centrally located opening. The guide member allows an extended wire stick out and a narrower tapered nozzle while protecting the nozzle and contact tip from spatter and heat and thereby enhances welding performance.

5 Claims, 3 Drawing Sheets

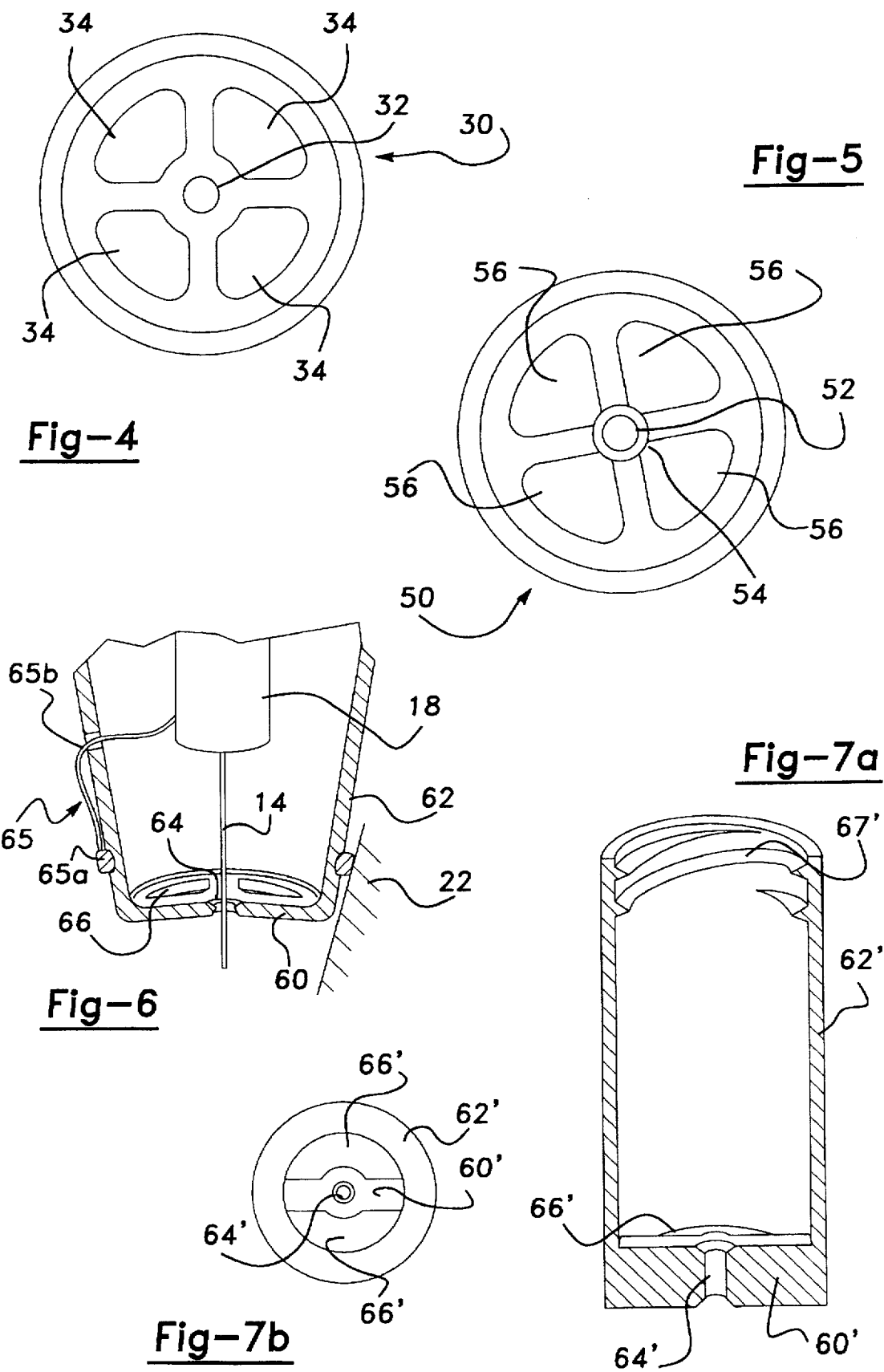

HIGH DEPOSITION WELD GUN NOZZLE

BACKGROUND OF THE INVENTION

1. Field of the Invention

The present invention relates to a ceramic cap for use on a nozzle of a gas metal-arc welding device, and more particularly, to a ceramic cap or nozzle which guides an electrode wire out of a gas metal-arc welding gun.

2. Description of Background Art

Inert and reactive gas-shielded metal-arc welding with consumable, continuous electrodes (called GMAW for gas metal-arc welding) is generally known as MIG welding. The GMAW arc is generally in an atmosphere of argon, argon mixes or $CO_2$, supplied from the GMAW gun nozzle.

A conventional gas metal-arc welding gun is shown in FIG. 1. The gas metal-arc welding gun 10 is attached to a wire feeder 12 which feeds a consumable electrode wire 14 through the gun 10. The gas metal-arc welding gun 10 is provided with a shielding nozzle 16 which generally covers a copper contact tip 18. The contact tip 18 directs the consumable electrode wire 14 from the gas metal-arc welding gun 10. A gas mix such as argon $CO_2$ or argon oxygen is supplied to the gas metal-arc welding gun 10 and passes through the copper shielding nozzle 16. A constant voltage power supply 20 is generally connected to the contact tip 18 of the gas metal-arc welding gun 10, and is also connected through the ground to the metal surface 22 which is being welded. The constant voltage power supply 20 provides the necessary voltage and current for creating an arc between the electrode wire 14 and the metal surface 22 which is being welded. The result of the arc which is created causes the tip of the electrode wire 14 to melt and deposit on the metal surface 22 being welded. As mentioned above, the shielding gas 26 protects a metal from the atmospheric oxygen and nitrogen which would negatively effect the weld quality.

A survey of gas metal-arc welding manual and robot installations reveals the following common problems. First, a burn back of the electrode wire 14 to the contact tip 18 often destroys the contact tip 18. Furthermore, spatter build up on the contact tip 18 and nozzle 16 can cause a short circuit between the contact tip 18 and the shielding nozzle 16. The contact tip problems are exaggerated in robot installations, in that they often result in time consuming programming requirements as frequently a robot welding station will not pick-up from where the weld problem occurred. In many instances, after a tip related problem, the operator loads another part to be welded and must leave the unfinished part to be completed by manual weld. Robot gas metal-arc welding gun contact tip problems cause production disruptions through tip replacement time, programming problems, rejection of parts and parts that will require manual rework.

In multi robot cells, the problems are further multiplied. A ten minute contact tip change for one robot means 30 minutes of weld production time lost in a triple robot cell.

The GMAW electrode wire 14 (FIG. 2) also typically has cast and helix problems which can misdirect the arc when robot welding.

Accordingly, it is desirable in the art of gas metal-arc welding to provide a guide for the electrode wire which protects the contact tip 18 and shielding nozzle 16 from heat, spatter, and burn back. It is also desirable for some applications if the nozzle allows an increase in traditional wire extension which reduces the current drawn and allows for higher weld deposition rates for an increase in weld productivity.

SUMMARY OF THE INVENTION

It is an object of the present invention to provide a ceramic nozzle cap for guiding the extended end of the electrode wire into the weld.

It is a further object of the present invention to provide a ceramic nozzle cap which compensates for deviations in the electrode wire cast or helix.

It is yet another object of the present invention to provide a ceramic nozzle cap which reduces the heat that is typically transferred to the gun 10, and thus, reduces the need in many applications for a water cooled gun.

It is a further object of the present invention to provide a ceramic nozzle cap for allowing the wire stick out to be extended and thus keeping the spatter and heat away from the contact tip and dramatically increasing the life of the contact tip.

It is yet another object of the present invention to provide a ceramic nozzle or cap which will allow the use of increased wire stick out. Increasing the wire stick out adds resistance to the current drawn, which allows for increasing wire feed rates with less than normal current drawn. The increased wire stickout allows for higher weld deposition rates which allow a robot to weld faster on certain applications.

It is still another object of the present invention to provide a ceramic nozzle cap for use on a metal nozzle of a gas metal-arc welding gun which is simple in structure, inexpensive to manufacture, easy to mass produce and durable in use.

These and other objects of the present invention are obtained by providing a ceramic nozzle or cap for a gas metal-arc welding gun. The nozzle or cap having a wire receiving hole in a center portion thereof for receiving and guiding an electrode wire of said gas metal-arc welding device. The ceramic nozzle cap is provided with a plurality of gas diffusion holes disposed radially outward from the wire receiving hole for diffusing a shielding gas supplied through the nozzle by the gas metal-arc welding device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings which are given by way of illustration only and thus are not limitative of the present invention, and wherein:

FIG. 4 is a plan view of a ceramic nozzle cap having a centrally disposed opening for receiving an electrode wire and a plurality of gas diffusion holes;

FIG. 5 is a plan view of a second embodiment of the ceramic nozzle cap according to the principles of the present invention with a centrally located opening for receiving an electrode wire through a metal insert and a plurality of equally spaced gas diffusion holes;

FIG. 6 illustrates a third embodiment of the present invention wherein the nozzle is formed of a ceramic and is formed as a unitary member with the cap, a nozzle-touch sensing system is also included for robotic applications;

FIGS. 7a and 7b illustrate a cross-sectional and end view, respectively, of a second nozzle formed of a ceramic and including an electrode wire guide portion;

DETAILED DESCRIPTION OF THE PREFERRED EMBODIMENTS

Figure 3:
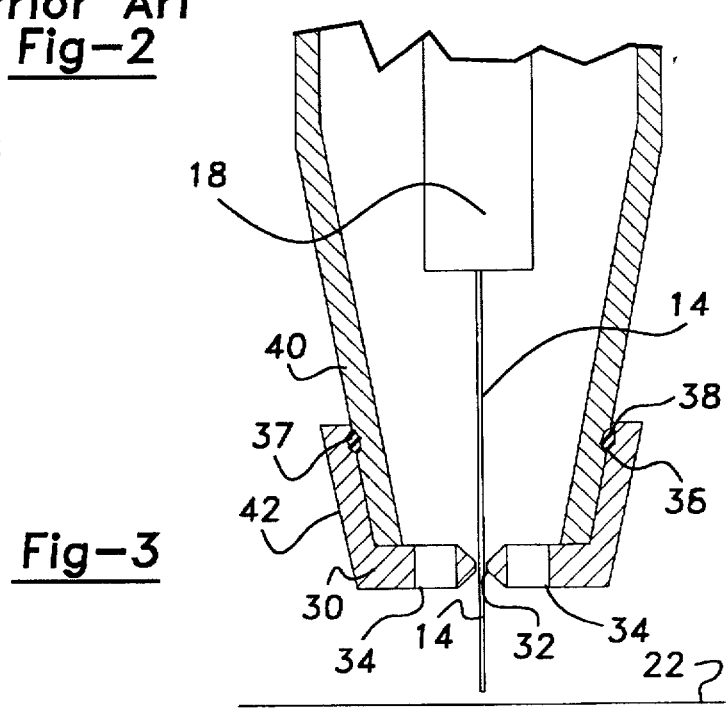
FIG. 3 is a cross-sectional view of a connection between a metal nozzle and the ceramic nozzle cap according to the principles of the present invention.

With particular reference to FIGS. 3 and 4, the first embodiment of the present invention will now be described. In FIG. 4, a nozzle cap 30 is shown having a generally centrally disposed opening 32 for receiving and guiding an electrode wire 14 of a gas metal-arc welding device. A plurality of gas diffusion holes 34 are provided radially outward from the centrally disposed opening 32. The gas diffusion holes 34 are preferably designed to direct the flow of inert gas directly at the weld. In this way, the amount of inert gas required can be reduced.

As best seen in the cross-sectional view of FIG. 3, the nozzle cap 30 is provided with an internal groove portion 36 which engages with an O-ring 37 supported in an outwardly grooved portion 38 of a shielding nozzle 40. The central opening 32 of the nozzle cap 30 provides a guide for the electrode wire 14 which passes through the contact tip 18. The gas diffusing holes 34 are provided for diffusing the inert gas 26 which passes through the nozzle 40. The ceramic nozzle cap 30 provides a guide for the electrode wire 14 while also providing an insulation for preventing arcing between the electrode wire 14 and the shielding nozzle 40. The shielding nozzle 40 is optionally provided with a taper so that the outer diameter at the nozzle tip 42 can be reduced. The use of a wire guide member such as the ceramic nozzle cap 30 allows the nozzle 40 to be tapered to provide a reduced dimension nozzle tip 42 which improves robot joint access. The wire guide member insures that the electrode wire 14 does not contact the nozzle 40. In contrast, a typical outside diameter of a traditional gas metal-arc welding gun is 18–20 mm. Thus, by use of the present invention, robot joint access can be improved by providing nozzles with outside diameters of 18 mm or less.

A second embodiment of the present invention will now be described with reference to FIG. 5. In FIG. 5, a ceramic nozzle cap 50 is shown having a centrally disposed opening 52 provided in a metal insert 54. The metal insert 54 is received in a central portion of the ceramic nozzle cap 50. A plurality of gas diffusion openings 56 are provided radially outward from the central opening 52. It should be readily understood that the gas diffusion openings 56 can have various sizes and shapes. It is also noted that the metal insert 54 is optionally provided for preventing wear caused by the electrode wire 14. The central opening 52 could be simply formed in an opening in the center of the ceramic nozzle cap 50. Similarly to the embodiment of FIG. 4, the ceramic nozzle cap of FIG. 5 can be provided with a groove for mating with an O-ring supported on the shielding nozzle 40 or the nozzle caps can be provided with an internally threaded surface for engagement with an externally threaded surface of the shielding nozzle 40. As another alternative, the nozzle caps can be glued to the shielding nozzle 40.

With respect to FIG. 5, it is further noted that the nozzle cap 50 can be formed of copper and that the insert 54 could be made of ceramic. The ceramic insert 54 would then serve to insulate the electrode wire 14 from the nozzle cap while guiding the electrode wire to a weld.

With reference to FIGS. 6 and 7A–8B a third embodiment of the present invention will now be described. In FIG. 6, a nozzle cap portion 60 is formed as a unitary member with a ceramic nozzle portion 62. The ceramic nozzle portion 62 replaces the shielding nozzle 40 of a conventional gas metal-arc welding device. The ceramic nozzle cap portion 60 is provided with a central opening 64 for receiving an electrode wire 14 of the gas metal-arc welding device. The nozzle cap portion 60 is also provided with a plurality of radially disposed gas diffusion openings 66 which diffuse the inert gas which passes through the ceramic nozzle 62. The ceramic nozzle portion 62 is connected to a gas metal-arc welding device by conventional methods. The ceramic nozzle portion 62 is also provided with a nozzle-touch sensing device 65 which would be used in robotic applications. The nozzle-touch sensing device 65 includes a copper ring 65a disposed around the ceramic nozzle portion 62, and a wire 65b which electrically connects the copper ring 65a to the contact tip 18. The nozzle-touch sensing device 65 works in the same manner as known nozzle-touch sensing devices which utilize a conventional copper nozzle for contacting the surface 22 of the material being welded and provides an electrical contact between the contact tip 18 and surface 22 being welded for indicating to the robot that contact has been made.

In FIGS. 7A and 7B, a nozzle cap portion 60' is formed as a unitary member with a non-tapered ceramic nozzle portion 62'. The ceramic nozzle cap portion 60' is again provided with a central opening 64' for receiving an electrode wire 14 of the gas metal-arc welding device. The nozzle cap portion 60' is also provided with a plurality of radially disposed gas diffusion openings 66' which diffuse the inert gas which passes through the ceramic nozzle 62'. The ceramic nozzle 62' is also provided with a threaded portion 67' for engaging with a threaded portion, not shown, on a gas-metal arc welding gun 10.

Figure 8A:
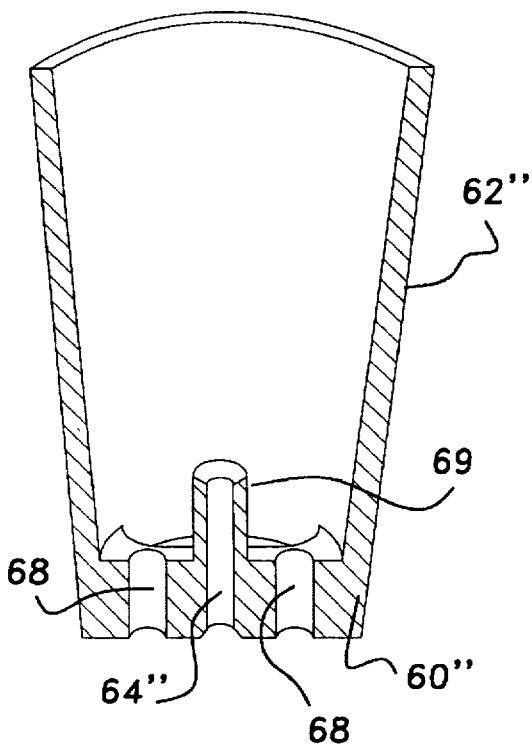
FIGS. 8a and 8b illustrate a cross-sectional and end view, respectively, of a third nozzle formed of a ceramic and including a longitudinally extended electrode wire guide portion.
Figure 8B:
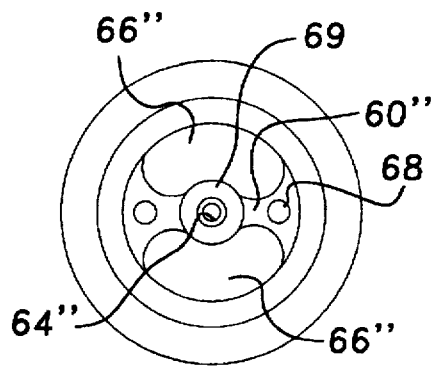

In FIGS. 8A and 8B, a nozzle cap portion 60" is formed as a unitary member with a tapered ceramic nozzle portion 62". The ceramic nozzle cap portion 60" is again provided with a central opening 64" for receiving an electrode wire 14 of the gas metal-arc welding device. The nozzle cap portion 60" is provided with a plurality of radially disposed gas diffusion openings 66" which diffuse the inert gas which passes through the ceramic nozzle 62". The nozzle cap portion 60" is also provided with a pair of openings 68 which further assist in diffusing the gas which passes through said tapered ceramic nozzle portion 62". The nozzle cap portion 60" also includes an axially extending portion 69 which provides additional support to the electrode wire 14 which extends from the contact tip 18 of the gas metal-arc welding gun.

Figure 9:
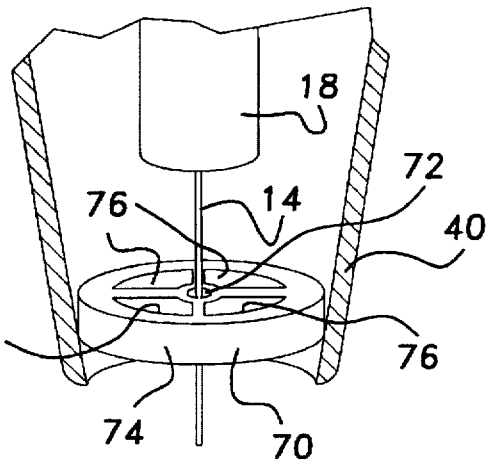
FIG. 9 illustrates a fourth embodiment of the present invention wherein a ceramic insert is inserted in the weld gun nozzle.

With reference to FIG. 9, a fourth embodiment of the present invention will now be described. In FIG. 9, a ceramic insert 70 is inserted within the nozzle 40 of a gas metal-arc welding device. The ceramic insert 70 is provided with a central opening 72 for receiving an electrode wire 14 which passes through a contact tip 18 of the gas metal-arc welding device. The ceramic insert 70 has an outer circumferential wall 74 which wedges against an internal surface of the nozzle 40. The ceramic insert 70 is also provided with a plurality of gas diffusion passages 76 for diffusing the inert gas passing through the nozzle 40. The ceramic insert 70 provides a guide for the electrode wire 14 which passes through the contact tip 18, while also providing an electrical insulation between the electrode wire 14 and the nozzle 40.

Figure 10:
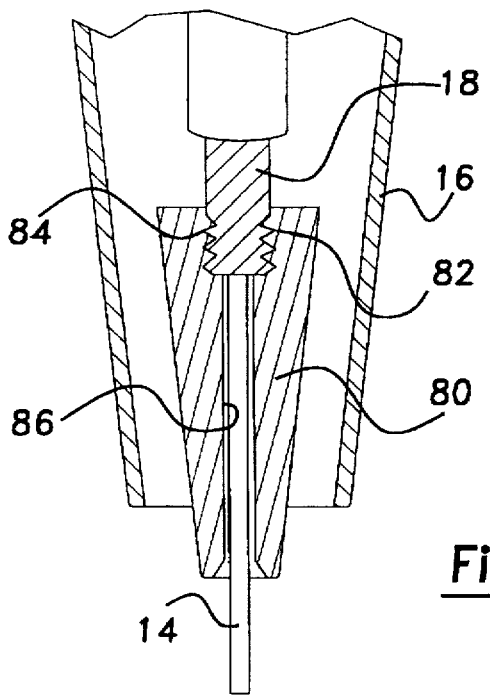
FIG. 10 illustrates a fifth embodiment of the present invention in which the electrode wire is guided to the weld through a ceramic contact tip which is joined to the copper contact tip.

With reference to FIG. 10, a fifth embodiment of the present invention will be described. In FIG. 10, a ceramic extension 80 is attached to the contact tip 18. The ceramic extension 80 has a threaded portion 82 which engages a corresponding threaded portion 84 on the contact tip 18. The ceramic extension 80 also includes a longitudinal opening 86 which receives and guides the electrode wire 14. It should also be understood that the ceramic extension 80 could be glued to the contact tip 18.

Figure 1:
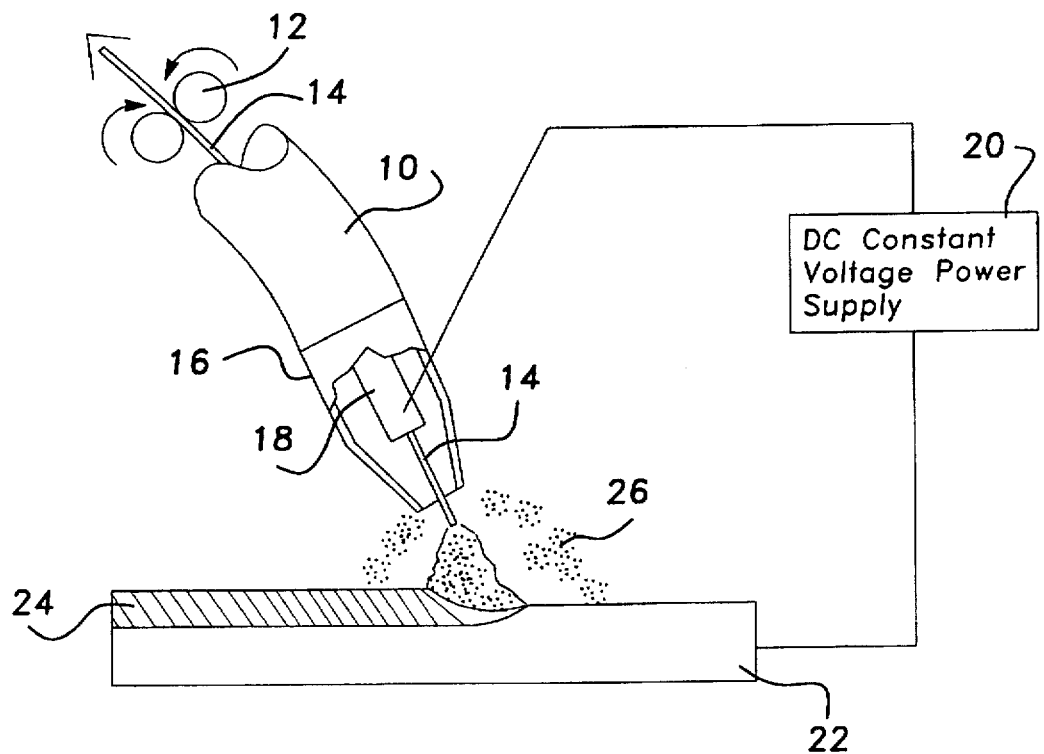
FIG. 1 illustrates a conventional gas metal arc-welding device as generally known in the prior art.
Figure 2:
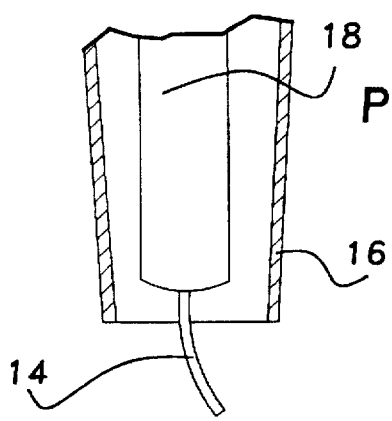
FIG. 2 illustrates a problem in the prior art that the electrode wire may have cast or helix deviation which cause the wire to be directed away from the weld.

In each of the embodiments disclosed above, the nozzle 40 is optionally allowed to be tapered closer to the electrode wire 14. In the prior art gas metal-arc welding devices, the shielding nozzles 16 are required to have a substantial clearance between the electrode wire 14 and the shielding nozzle 16. As illustrated in FIG. 2, the clearance between the shielding nozzle 16 and electrode wire 14 is required because deviations in the cast of electrode wire 14 can cause the electrode wire 14 to be directed away from the weld and toward the shielding nozzle 16. If the electrode wire 14 comes too close to the shielding nozzle 16 an arcing can occur. With the present invention, because the ceramic nozzle cap (30, 50, 60, 60', 60"), insert (70) or ceramic extension (80) each insure that the electric wire 14 passes straight from the contact tip 18 of the gas metal-arc welding device, the distance between the nozzle 40 and the electrode wire 14 can be decreased. The decreased nozzle dimension at the nozzle opening 42 provides for improved robot joint access.

In addition, because the ceramic nozzle cap (30, 50, 60, 60', 60"), insert (70) or ceramic extension (80) guide the extended wire 14 to the central portion of the nozzle 40, the accuracy of a robot welding device can be greatly increased since the electrode wire 14 can be accurately extended into the weld. Furthermore, the ceramic cap (30, 50, 60, 60', 60"), insert (70) or ceramic extension (80) compensates for deviations in the wire cast or helix. Thus, welding accuracy is enhanced.

The ceramic cap (30, 50, 60, 60', 60") or insert (70) also reduces the heat that is typically transferred to the nozzle. The ceramic material provides an insulation for the nozzle which in many applications will reduce the need for a water cooled gas metal-arc welding gun. In addition, the ceramic cap (30, 50, 60, 60', 60"), insert (70) or ceramic extension (80) in combination with the extended wire stick out keeps the spatter and heat away from the contact tip 18, thus dramatically increasing the life of the contact tip 18. It should be noted that any increase in the life of the welder components results in less robot down time and overall increased production.

The use of a ceramic nozzle cap (30, 50, 60, 60', 60"), insert (70) or ceramic extension (80) results in an extended wire stick-out which is properly guided and will allow on many applications, an increase in welding speed. The extended wire stick-out will also allow lower current with higher weld deposition rates which will reduce weld distortion potential for all carbon steels, stainless steels, alloy steels and aluminum. In addition, the extended wire stick-out will allow small diameter wires to be used for the first time in the spray transfer mode on applications which were previously considered to be too hot. The extended wire stick-out will also allow larger, lower cost electrode wires, to be used on applications in which they were not typically suited.

Further, the ceramic cap or insert on the nozzle will act as a gas diffuser, and reduce the amount of inert gas that is used with traditional gas metal-arc welding nozzles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A gas metal-arc welding device, comprising:

a ceramic nozzle; and a ceramic nozzle cap formed integrally with said ceramic nozzle and having a wire receiving hole in a center portion thereof for receiving and guiding an electrode wire of said gas metal-arc welding device.

2. The welding device according to claim 1, wherein said ceramic nozzle cap includes a plurality of gas diffusion holes disposed radially outward from said wire receiving hole for diffusing a shielding gas supplied through said ceramic nozzle by said gas metal-arc welding device.

3. The welding device according to claim 1, further comprising a nozzle-touch sensing device supported on said ceramic nozzle.

4. The welding device according to claim 1, wherein said ceramic nozzle cap is provided with an axially extending portion defining said wire receiving hole.

5. A gas metal-arc welding device, comprising:

a nozzle;

an electrically conducting contact tip disposed within said nozzle;

a ceramic nozzle cap spaced from said contact tip and having a wire receiving hole in a center portion thereof for receiving and guiding an electrode wire of said gas metal-arc welding device; and a metal insert for defining said wire receiving hole in said ceramic nozzle cap.

* * * * *